Figure 1:
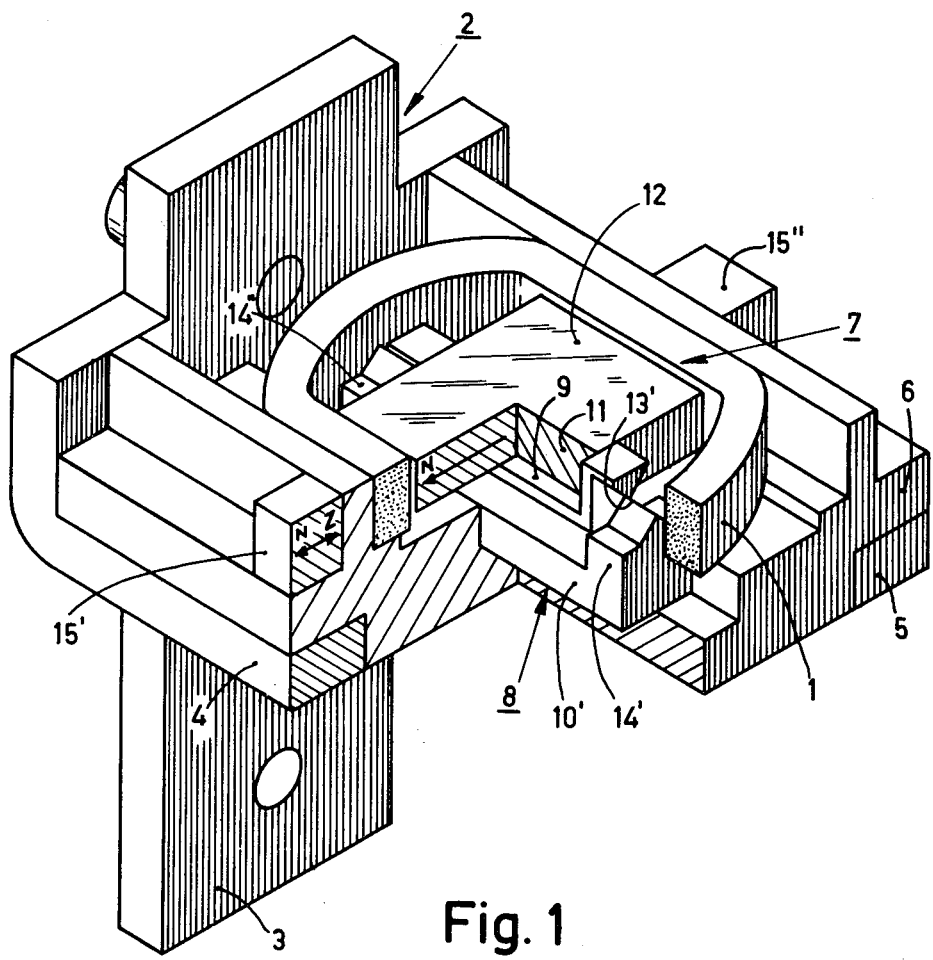

United States Patent [19]

Ong et al.

[11] 4,057,331
[45] Nov. 8, 1977

[54] ELECTRO-MAGNETICALLY CONTROLLABLE BEAM DEFLECTION DEVICE

[75] Inventors: Daniël Ong; Johannes Cornelius Antonius Muller, both of Eindhoven, Netherlands

[73] Assignee: U.S. Philips Corporation, New York, N.Y.

[21] Appl. No.: 633,284

[22] Filed: Nov. 19, 1975

[30] Foreign Application Priority Data
Oct. 3, 1975 Netherlands .......................... 7511635

[51] Int. Cl.² .............................................. G02B 27/17
[52] U.S. Cl. .................................................... 350/285
[58] Field of Search .............................. 350/6, 285, 16

[56] References Cited
U.S. PATENT DOCUMENTS

| 3,011,124 | 11/1961 | Hermann et al. | 350/285 |
| 3,071,036 | 1/1963 | McKnight et al. | 350/6 |
| 3,253,525 | 5/1966 | Merkel | 350/16 |
| 3,642,344 | 2/1972 | Corker | 350/6 |

FOREIGN PATENT DOCUMENTS 354,117   6/1961   Switzerland ............................ 350/7

Primary Examiner—John K. Corbin
Assistant Examiner—R. A. Rosenberger
Attorney, Agent, or Firm—Frank R. Trifari; Simon L. Cohen

[57] ABSTRACT

An electro-magnetically controllable beam deflection device for use in an optical system for deflecting a radiation beam obtained from a radiation source, in particular for use in video players. The deflection means may for example comprise a pivoting mirror, or an assembly of a plano-concave and a plano-convex lens which with their concave and convex surfaces face each other, and can perform pivoting movements at a small distance from each other. The deflection means is connected to frame by means of an integrated plastic bearing component. The bearing component has a local portion of small cross-section which under the influence of the control forces exerted on the deflection means, is relatively readily deformable. This portion may for example take the form of an integral hinge or of a thin cylindrical portion.

10 Claims, 4 Drawing Figures

ELECTRO-MAGNETICALLY CONTROLLABLE BEAM DEFLECTION DEVICE

The invention relates to an electro-magnetically controllable beam deflection device for use in an optical system for deflecting of a beam of radiation which is obtained from a radiation source, in particular to be used in a video player, and comprising a frame, a deflection means which is pivotably mounted on the frame, bearing means for pivotably supporting the deflection means by the frame, which bearing means comprise at least one integrated bearing component made of an elastic synthetic material which has a first portion connected to the deflection means and a second portion connected to the frame and first and second electromagnetic control means connected to the frame and the deflection means respectively, in the form of permanent magnetic and/or electromagnetic circuits including one or more electrical coils.

From Swiss Pat. Specification 354,117 a beam deflection device is known in which the deflection means consists of a pivoting mirror comprising a permanent-magnetic body provided with a reflecting coating. The pivoting mirror is journalled in that it is embedded in a rubber-like compound which is located between the polepieces of a U-shaped yoke on which a control coil is mounted. By energizing the coil the pivoting mirror is subject to a torque so that it performs a pivoting movement in the elastic material in which it is embedded. Alternatively, it is possible to mount the pivoting mirror in a rubber-like compound which is located in a space between the pole pieces of two mutually perpendicular yokes which are each provided with an associated control coil, so that the reflecting surface can be pivoted about two mutually perpendicular axes.

The known pivoting mirror was intended for use in television receivers of the type in which a light beam instead of an electron beam is controlled. In view of the application pursued, in particular with respect to the dimensions of the television tubes then used, only a very slight movability of the mirror was required, so that completely embedding the mirror leaving the reflecting surface free, presented a satisfactory solution for the object in view. In recent years there has been a substantial revival of beam deflection devices in view of applications in video players. For this purpose mainly pivoting mirror devices are suitable, as well as a deflection device which includes a lens system comprising an assembly of a plano-concave lens and a plano-convex lens, the concave surface of the first lens facing the convex surface of the second lens and these surfaces having substantially the same radius of curvature and being disposed at a distance which is much smaller than the radius of curvature, while at least one of the lenses is pivotably arranged in such a way that the pivoting axes of the lenses are mutually perpendicular and are disposed in a plane perpendicular to the optical axis of the lens system as in U.S. Pat. No. 3,924,063 issued Dec. 2, 1975. In the professionnal jargon such a device is generally referred to as a "variable wedge", Therefore this expression will also be used hereinafter.

In recent years video players have been developed in which video information contained on a rotating disk can be read with the aid of a read beam, for example a laser beam, which is aimed at the disk with the aid of optical means, among which the beam deflection device, for accurately following and reading the tracks on the disk, see for example the articles: "The Philips VLP system," Philips Technical Review 33, 178 – 193, 1973, no. 7; "Ein neues Bildplattensystem mit transparenter Folie," Funkschau, Heft 20, 2286 – 2288, 1974, and "The MCA Disco-Vision System," Journal of the SMPTE, volume 83, July 1974. For applications in such video players the beam deflection device should meet other requirements than the device that is known from the cited Swiss Patent Specification. Specifically, a substantially greater movability of the mirror is required, i.e. using a comparatively low power a comparatively large deflection of the pivoting mirror must be attainable at a comparatively low frequency. The beam deflection device is included in an automatic control circuit which serves for following the tracks on the video disk with the read beam. The speed of revolution of the video disk is 1500 or 1800 revolutions per minute, depending on the main frequency which is 50 or 60 Hz respectively. For following the track the beam deflection device must be capable of following an oscillation of the track with an amplitude of $200/\mu$ at an oscillation frequency of 25 Hz. In view of the stability of the stability of the control circuit it is desirable that the bearing has a certain damping.

It is an object of the invention to provide a beam deflection device of the type mentioned in the preable, which is in particular suitable for use in video players, and the invention is characterized in that each integrated bearing component between said first and second portions comprises a third portion having a cross-section which is substantially smaller with respect to the other two portions, which third portion is relatively readily deformable under the influence of the electromagnetic control forces exerted on the deflection means.

In this way beam deflection devices can be obtained which are durable, which can be mass-produced at low cost and which comply with the requirements and furthermore allow different embodiments. For example in one embodiment the third portion of the bearing component may be an integral hinge of substantially rectangular cross-section, the longitudinal axis of the rectangle substantially being the hinge axis and coinciding with a pivoting axis of the bearing component. In a different embodiment the third portion of the bearing component may alternatively have substantially cylindrical cross-section, the pivoting axis of the bearing component substantially coinciding with the cylinder axis, or being disposed perpendicularly thereto. In this respect it may be advantageous to fit a metal wire in the center of the third portion, in the direction of the cylinder axis, so as to increase the rigidity of the third portion in order to a counteract pivoting about pivoting axes perpendicular to the cylinder axis.

When the beam deflection device is a pivoting mirror device, comprising a base with a coating having a reflecting surface and pivotable about a single pivoting axis parallel to the reflection surface, it may be advantageous to use an embodiment which is characterized in that said second bearing means portion which is connected to the frame comprises a substantially U-shaped yoke, the first portion which is connected to the pivoting mirror is disposed between the legs of the U, and the first portion at either side of the pivoting mirror is connected to the yoke by means of integral hinges.

Thus, a pivoting mirror device can be obtained of simple and rational construction, which can be manufactured and assembled easily, the accurate alignment of the integral hinges presenting no problems. By the use of two integral hinges at either side of the pivoting mirror a bearing arrangement is obtained which is sufficiently sensitive, i.e. which only slightly counteracts pivoting movements, and which furthermore has the advantage that the pivoting axis may be disposed in the plane of the reflecting surface.

In the case of pivoting mirrors which are pivotable about every axis parallel to the reflecting surface, an embodiment may be used which is characterized in that the integrated bearing component consists of a substantially cylindrical support, that the comparatively readily deformable portion consists of a local narrowing of the substantially cylindrical support, that the cylindrical support is axially movable relative to the frame, and that locking means are provided for locking the cylindrical support in its axial position relative to the frame. This construction allows a very simple adjustment of the position of the pivoting mirror relative to the frame.

A further embodiment of the invention is characterized in that permanent magnetic positioning means for moving the pivoting mirror to its neutral position are provided, which are connected to the frame and which magnetically co-operate with the permanent magnetic control means, and that the positioning means while co-operating with the permanent magnetic control means continuously load the pivoting mirror in a direction away from the frame. This had the advantage that the most vulnerable part of the bearing system, namely the third portion of substantially smaller cross-section, is always subject to a tensile load. A pressure-load, for example by the electromagnetic control means, or owing to shocks, might cause this portion to collapse.

An embodiment of the invention which relates to a variable wedge is characterized in that each of the pivotable lenses is mounted in an end of a substantially cylindrical sleeve which is pivotable relative to the other lens, belonging to the system, and the sleeve is connected to the frame by means of two bearing conponents whose pivoting axes coincide, which components are disposed at either side of the sleeve. This results in a device which can be manufactured and assembled in a comparatively simple manner.

In this respect it is advantageous to use a further embodiment which is characterized in that each of the pivotable lenses is mounted in one end of a substantially cylindrical sleeve which is pivotable relative to the other lens belonging to the system, and that the pivotable sleeve is connected to the frame by means of two bearing components which are disposed at either side of the sleeve and whose pivoting axes coincide. This yields a variable wedge of compact construction which can simply be incorporated in a video player.

Figure 2:
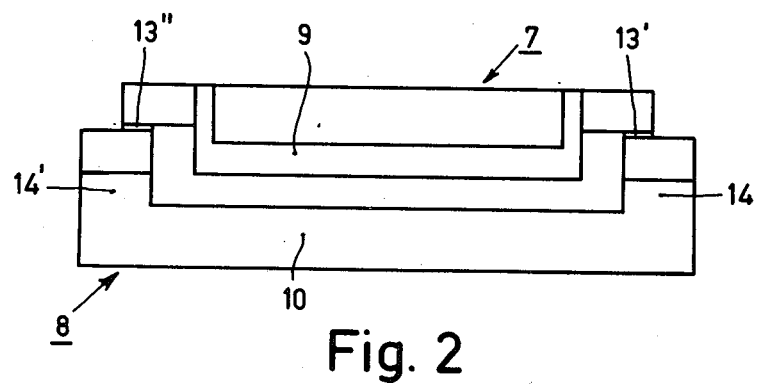

The invention will be described with reference to the drawing, which shows three embodiments of the invention and in which:

FIG. 1 in perspective and partly in cross section shows a beam deflection device consisting of a pivoting mirror device of which the pivoting mirror is pivotable about a single axis parallel to its reflecting surface, FIG. 2 shows a sideview of the mirror with its associated bearing means and belonging to the device shown in FIG. 1.

Figure 3:
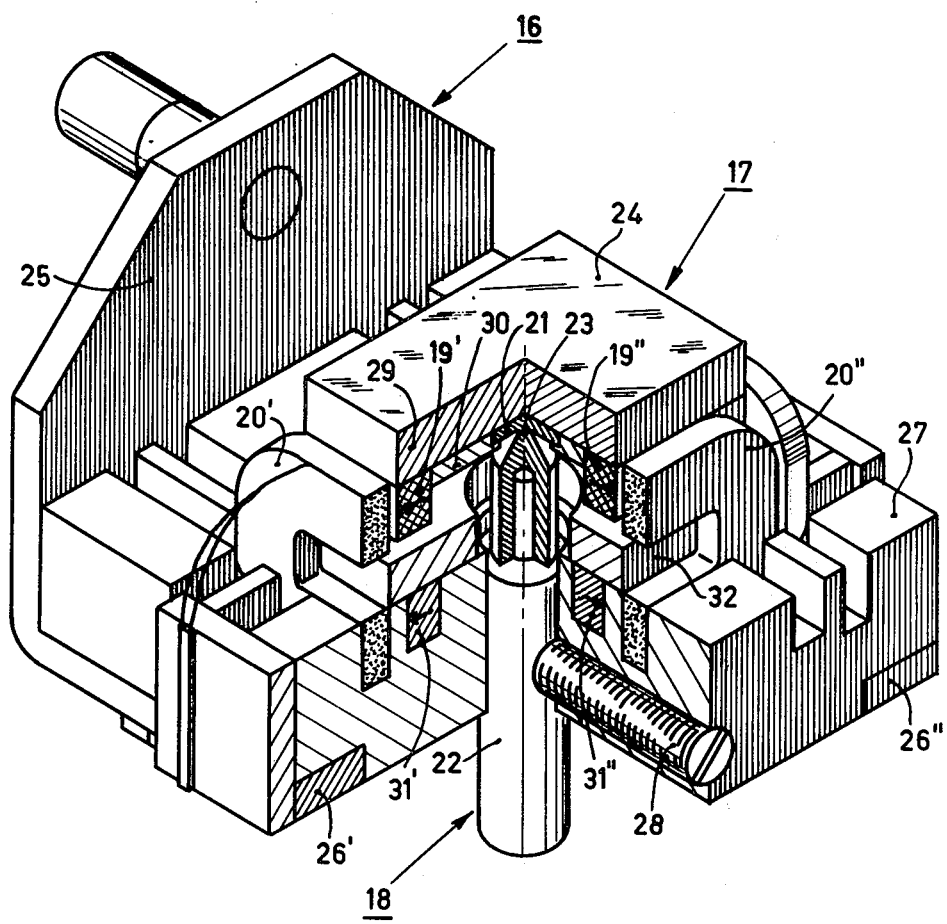
Figure 4:
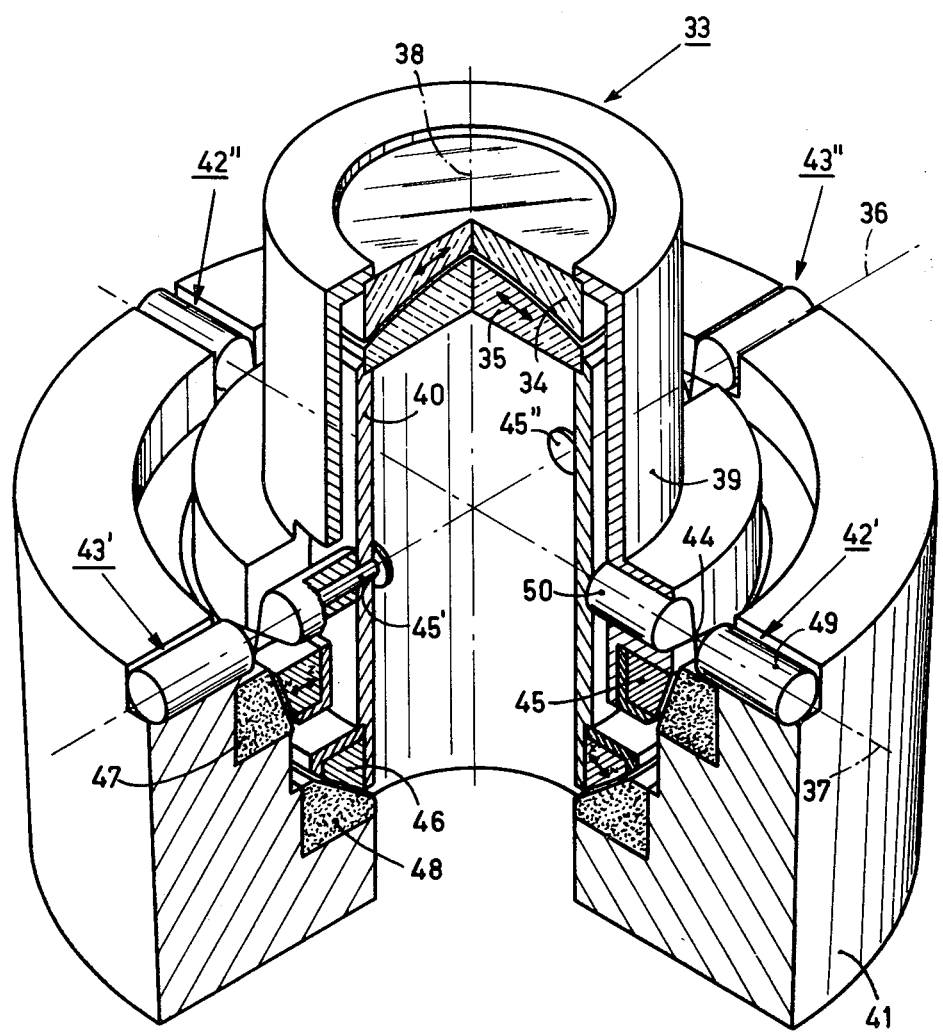

FIG. 3 in perspective and partly in cross-section shows a second pivoting mirror device in which the pivoting mirror is pivotable about every axis parallel to the reflecting surface and passes through a certain point on the neutral optical axis of the device and which can be adjusted and locked in an axial direction relative to the frame, and FIG. 4 in perspective and partly in cross-section shows a beam deflection device of a different type, comprising a lens system which consists of a plano-concave and a plano-convex lens, which are each separately mounted in a cylindrical sleeve, the sleeves each being pivotable about a single axis and the said two pivoting axes being perpendicular to each other and being disposed in a single plane.

In FIG. 1 the pivoting mirror device is denoted by the general reference numeral 1. It comprises a frame 2 which is made of a non-magnetic material and comprises a mounted plate 3 as well two supporting arms 4 and 5 which are bent at right angles thereto. These arms carry a block, also made of a non-magnetic material and provided with grooves and ridges, on which the tilting mirror 7 is pivotably arranged. For this purpose bearing means are disposed between the block 6 and the pivoting mirror 7, which are designated by the reference numeral 8. Said bearing means consists of an integrated bearing component, which is made of an elastic synthetic material, for example polypropylene, which comprises the portions 9 and 9', which are connected to the pivoting mirror, and the portions 10 and 10', which are connected to the frame. When hereinafter reference is made to these and other identical components in a general sense, the apostrophees will be omitted for simplicity.

The pivoting mirror 7 comprises a base 11 of a permanent magnetic material as well as an extremely thin reflecting layer 12 disposed thereon. Said layer is so thin that it cannot be indicated in cross-section on the drawing. The permanent magnetic base 11 is transversely magnetized, which in the Figure is indicated by an arrow, the letter N near the arrow head indicating that the magnetic northpole is located there. This magnetic base constitutes the permanent magnetic part of the electro-magnetic control means for the pivoting mirror 7. These means further comprise the substantially annular coil 1, which is arranged around the pivoting mirror on the block 6.

Between said first and second portions 9 and 10 of the bearing component 8 a third portion 13 is located of substantially smaller cross-section, which is comparatively readily deformable under the influence of electromagnetic control forces exerted on the pivoting mirror. For this see especially FIG. 2.

Said second portion 10 of the bearing means 8, which is connected to the frame 2 comprises a substantially U-shaped yoke, of which the first portion 9 connected to the pivoting mirror 7 is disposed between the legs of the U. The first portion 9 is connected to the yoke 10 at either side of the pivoting mirror 7 by means of integral hinges 13. The bearing component 8 can be manufactured as a single injection-moulded component of a thermoplastic material and the mirror 7 can be glued to the portion 9 by suitable means. The portion 10 is slightly movable in the block 6, so that during assembly a certain alignment is possible at least in the direction of the pivoting axis of the mirror.

On the block 6 two positioning magnets 15 are disposed. The direction of magnetization thereof is indicated in the Figure with the aid of a double arrow and the letters N and Z. These positioning magnets in conjunction with the base 11 of the pivoting mirror 7 provide the necessary forces for returning the pivoting mirror to its neutral position in the absence of a control signal.

The pivoting mirror device of FIG. 3 bears great resemblance to that of FIG. 1 in some respects. The frame is denoted by the reference numeral 16, the pivoting mirror by 17, the integrated bearing components by 18, and the electro-magnetic control means, i.e. the permanent magnets and the control coils, by 19 and 20 respectively. The bearing component 18 comprises a first portion 21 which is connected to the pivoting mirror 17, a second portion 22 which is connected to the frame 16, as well as a third portion 23 with a cross-section which in proportion is substantially smaller. This third portion has a substantially cylindrical cross-section and the mirror 17 is pivotable about every axis parallel to the reflecting surface 24 and passing through a point substantially in the center of this third portion and thus is always substantially perpendicular to the cylindrical axis of the portion 23.

In this pivoting mirror device the frame 16 also comprises a mounting plate 25 as well two supporting arms 26 which are perpendicular thereto. On these arms a block 27 is mounted in which a number of recesses are formed, which inter alia accommodate the coils 26 and the bearing component 18. Said bearing component comprises a substantially cylindrical support, while the comparatively readily deformable portion 23 consists of a local narrowing. In an axial direction, i.e. perpendicular to the reflecting surface 24 when the pivoting mirror 17 is in its neutral position, the cylindrical support is movable relative to the frame in view of a correct axial adjustment of the pivoting mirror. With the aid of a locking screw 28 the support is locked in its axial position relative to the frame.

The mirror 17 consists of a glass base 29 with the reflecting coating 24. The four magnets 19 are glued to the underside of the base 29. Also glued to the underside of the base 29 is a plate 30, which encloses and secures the portion 21 of the bearing component 18. Moreover, this bearing component itself may also be glued to the base.

In the grooves in the block 27 four permanent magnets 31 are disposed, which are enclosed by a closing plate 32. These magnets have the function of positioning magnets for moving the pivoting mirror 17 to its neutral position. The positioning magnets co-operate with the permanent magnets 19 in such a way that the pivoting mirror is continually loaded in a direction away from the block 27. The direction of magnetization of the magnets 19 and the magnets 31 is again indicated by arrows in FIG. 3.

FIG. 4 relates to a beam deflecting device of a different type, referred to hereinbefore as variable wedge. The deflection means 33 consists of an assembly of a plano-concave lens 34 and a plano-convex lens 35 which are arranged in such a way relative to each other that the concave surface of the lens 34 faces the convex surface of the lens 35. The two lenses have substantially the same radius of curvature at their facing sides and are disposed at a distance from each other which is much smaller than the radius of curvature. The two lenses are pivotably disposed in such a way that their pivoting axes, which are designated 36 and 37 in the Figure, are mutually perpendicular and are disposed in a plane perpendicular to the optical axis 38 of the lens system.

The plano-concave lens 34 is mounted in one end of a sleeve 39 inside which a concentric sleeve 40 is located in which the plano-convex lens 35 is mounted. The two sleeves are pivotable relative to each other, obviously to a limited extent. They are each connected to a frame 41 by means of two bearing components disposed at either side. For the sleeve 39 these are the bearing components 42 and for the sleeve 40 the bearing components 43. These bearing components are arranged so that their pivoting axes coincide with the pivoting axes 37 and 36 respectively. The bearing components 42 and 43 have a shape which bears greater resemblance to that of the bearing component 18 of the pivoting mirror device of FIG. 3. Again a thin cylindrical portion 44 is provided in which in the present instance metal wires are fitted in view of the weight of the lenses and the sleeves in which they are mounted, in order to increase the rigidity of the portion 44 so as to oppose pivoting movements perpendicular to the cylinderical axis. Said metal wires are not shown in FIG. 4. The bearing components 42 are connected to the sleeve 39 by pressing-in and, as the case may be, by glueing, while they are secured in the frame 41 in a similar way. The bearing components 43 are connected to the sleeve 40 by means of a fixing pin 45. In this case the various connections can also be made by gluing and/or pressing.

At its end which faces the lens 34 the sleeve 39 is provided with a second control means in the form of a substantially annular permanent magnet 45 which is mounted around the sleeve and which is magnetized diametrically and perpendicularly to the pivoting axis 37. The sleeve 40 is provided with a similar permanent magnet 46. These two annular magnets co-operate with corresponding control coils which are mounted on the frame 41 and which are denoted by the reference numerals 47 and 48 respectively.

What is claimed is:
1. An electro-magnetically controllable beam deflection device for use in an optical system for deflecting a radiation beam obtained from a radiation source, in particular to be used in a video player, and comprising:
   a frame
   a deflection means which is pivotably mounted on the frame
   bearing means for pivotably supporting the deflection means by the frame, which bearing means comprise at least one integrated bearing component made of an elastic synthetic material, said bearing means having a first portion connected to the deflection means and a second portion connected to the frame, and
   first and second electro-magnetic control means connected to the frame and the deflection means respectively, in the form of electro-magnetic circuits which include at least one electrical coil, the improvement wherein each integrated bearing component between said first and second portions comprises a third portion having a cross-section which is substantially smaller with respect to the other two portions, which third portion is comparatively readily deformable under the influence of the electro-magnetic control forces exerted on the deflection means.

2. An electro-magnetically controllable beam deflection device as claimed in claim 1, wherein the third portion of bearing component is an integral hinge of substantially rectangular cross-section, the longitudinal axis of the rectangle substantially being the hinge axis and coinciding with a pivoting axis of the bearing component.

3. An electro-magnetically controllable beam deflection device as claimed in claim 1, wherein the third portion of the bearing component has a substantially cylindrical cross-section, the pivoting axes of the bearing component being perpendicular to the cylinder axis of the bearing component.

4. An electro-magnetically controllable beam deflection device as claimed in claim 1, wherein the deflection means of said pivoting mirror, comprising a base on which a layer with a reflecting surface is provided and pivotable about a single pivoting axis parallel to the reflecting surface, and wherein
said second portion of the bearing means which is connected to the frame comprises a substantially U-shaped yoke,
the first portion, which is connected to the pivoting mirror is disposed between the legs of the U, and
the first portion at either side of the pivoting mirror is connected to the yoke by means of integral hinges.

5. An electro-magnetically controllable beam deflection device as claimed in claim 1, wherein the deflection means consists of a pivoting mirror, comprising a base on which a layer with a reflecting surface is mounted and pivotable about every axis parallel to the reflecting surface and passing through a certain point on the neutral optical axis, and wherein
the integrated bearing component consists of a substantially cylindrical support,
the comparatively readily deformable portion consists of a local narrowing of the substantially cylindrical support,
the cylindrical support is axially movable relative to the frame, and
locking means are provided for locking the cylindrical support in its axial position relative to the frame.

6. An electro-magnetically controllable beam deflection device as claimed in claim 5, the electro-magnetic control means comprising permanent magnetic control means which are connected to the pivoting mirror, and wherein
permanent magnetic positioning means for moving the pivoting mirror to its neutral position are provided, which are connected to the frame and which magnetically co-operate with the permanent magnetic control means and
the positioning means while co-operating with the permanent magnetic control means continually load the pivoting mirror in a direction away from the frame.

7. An electro-magnetically controllable beam deflection device as claimed in claim 1, wherein the deflection means is a lens system which consists of an assembly of a plano-concave lens and a plano-convex lens, the concave surface of the first lens facing the convex surface of the second lens, said surfaces having a substantially equal radius of curvature and being disposed at a distance which is substantially smaller than the radius of curvature, at least one of the lenses being pivotably disposed in such a way that the pivoting axes of the lenses are mutually perpendicular and are disposed in a plane perpendicular to the optical axis of the lens system, and wherein
each of the pivotable lenses is mounted in an end of a substantially cylindrical sleeve, said sleeve being pivotable relative to the other lens which belongs to the system, and
the pivotable sleeve is connected to the frame by means of two bearing components whose pivoting axes coincide, which components are located at either side of the sleeve.

8. An electro-magnetically controllable beam deflection device as claimed in claim 7, wherein
each of the pivotable sleeves at its end which faces the lens is provided with a second control means in the form of substantially annular permanent magnet mounted around the sleeve and magnetized diametrically, perpendicularly to the pivoting axis of the relevant sleeve, and
on the frame an annular coil is conmounted which cooperates with the annular permanent magnet.

9. An electro-magnetically controllable beam deflection device as claimed in claim 1, wherein the third portion of the bearing component has a substantially cylindrical cross-section, the pivoting axis of the bearing component substantially coinciding with the cylinder axis of the bearing component.

10. An electro-magnetically controllable beam deflection device as claimed in claim 9, whereinin the center of the third portion and in the direction of the cylinder axis a metal wire is fitted so as to increase the rigidity of the third portion against pivoting movements about pivoting axes perpendicular to the cylinder axis.

* * * * *